May 18, 1954  G. E. THOMAS  2,678,682
COMBINATION ARMREST AND CONTAINER FOR AUTOMOTIVE VEHICLES
Filed July 14, 1952
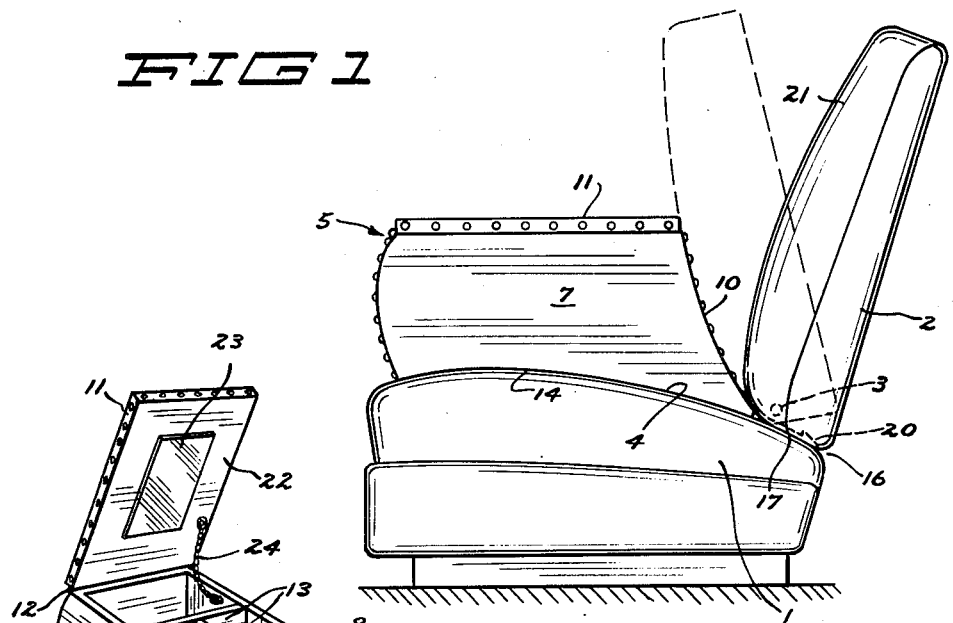
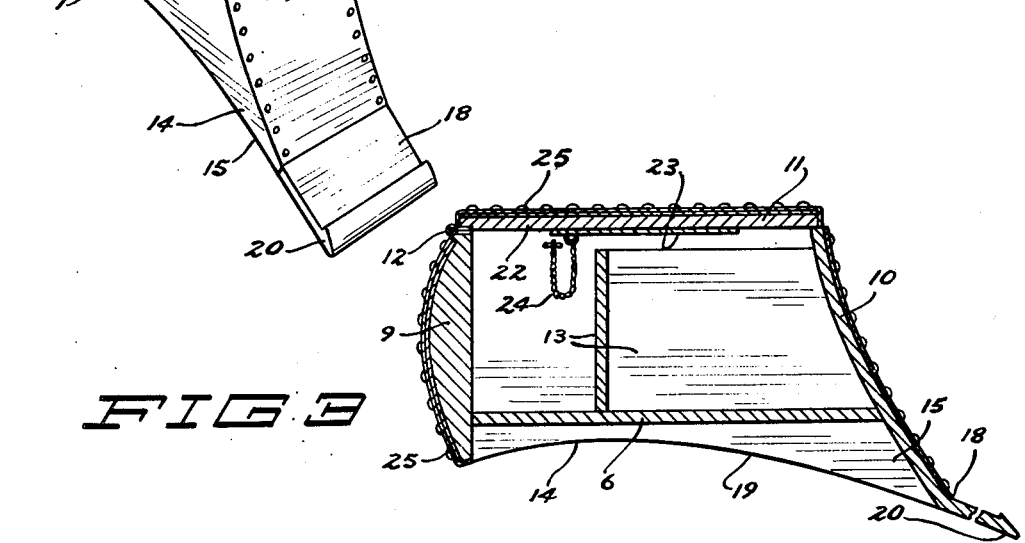
INVENTOR.
Guy E. Thomas
BY
ATTORNEYS Patented May 18, 1954

2,678,682

UNITED STATES PATENT OFFICE 2,678,682

COMBINATION ARMREST AND CONTAINER FOR AUTOMOTIVE VEHICLES

Guy E. Thomas, St. Petersburg, Fla.

Application July 14, 1952, Serial No. 298,791

1 Claim. (Cl. 155—112)

My invention relates to arm rests for drivers of automotive vehicles and provides a combination storage compartment and arm rest for such purpose.

The primary object of my invention is the provision of a combination storage compartment and arm rest for automobile drivers which may be used in conjunction with seats having pivotally mounted back rest elements which must be rocked forwardly to permit entrance of passengers into the rear seat of the vehicle. Such seats are conventional on all modern two seated vehicles having but one door on each side.

A further object of my invention is the provision of a structure which has a removable, preferably hinged, top portion which gives access to a storage compartment, compartmented as desired, for storage and transportation of numerous articles.

A still further object of my invention is the provision of an arm rest for automotive vehicles which is provided with novel means for securing same in a desired set position.

A still further object of my invention is the provision of a device of the class described which is inexpensive to construct, rigid in construction, durable in use, and decorative in appearance.

The above and still further objects of my invention will become apparent from the following detailed specification, appended claim, and attached drawings.

Referring to the drawings wherein like characters indicate like parts throughout the several views:

Fig. 1 is a view in side elevation of a conventional seat of an automotive vehicle with my novel arm rest in position thereon;

Fig. 2 is a view in perspective of my novel structure; and

Fig. 3 is an enlarged view in axial section.

Referring with greater particularity to the drawings, the numeral 1 indicates an upholstered automotive seat having an upholstered cooperating back rest element 2 pivotally secured thereto and upstanding therefrom in a normal backwardly-tilted position. The pivotal connection of the back rest element 2 is indicated by the numeral 3 and, as shown, is closely adjacent to the upper surface 4 of the seat 1. Back rest element 2 is restrained from swinging movements beyond the full line position, Fig. 1, but is permitted limited pivotal movements in a forward direction to substantially the dotted line position of Fig. 1 to enlarge the space therebetween and the door of the vehicle to permit entry to the rear seat, not shown.

My novel structure is identified in its entirety by the numeral 5 and includes a bottom 6, upstanding walls 7 and 8, front and rear walls 9 and 10 which interconnect the side walls 7 and 8, and a cover element 11, preferably and as shown, hinged at its forward edge as indicated at 12. Elements 6, 7, 8, 9, 10 and 11 cooperate to provide a box-like structure which may be suitably compartmented by any desirable arrangement of compartment walls indicated by the numeral 13. Also, preferably the bottom 6 and walls 7, 8, 9, and 10 may be formed of any suitable material, preferably water proofed to make possible storage of moisture containing articles.

As shown, the bottom edges 14 are slightly concave from front to rear so as to rest upon and conform generally to the upper surface 4 of the seat 1. Rear wall 10 tapers downwardly and rearwardly and terminates, together with similarly shaped portions of the walls 7 and 8, in a relatively pointed rear portion 15 which is, as shown in Fig. 1, adapted to be wedged partially into the crack 16 between the upper surface 4 of the seat element 1 and the lower surface 17 of the back rest element 2. This aids in retaining the structure in a desired set position to the right of the driver. However, as a more positive means of retaining the structure 5 in a desired set position, I provide a relatively thin tongue 18 which projects downwardly and outwardly from the relatively pointed rear portion 15 and is adapted to extend completely through the crack between seat element 1 and the back rear element 2. Preferably, and as shown, the tongue 18 is in the nature of an extension to a false bottom element 19 secured to the bottom edge 14 of the side walls 7 and 8. Also preferably and as shown, tongue 18 has an enlarged transversely extending locking lip 20 at its free end which is of a size to be forced through the crack 16 but will prevent accidental removal of the tongue 18 therethrough.

With respect to Fig. 1 it will be noted that the rear wall 10 converges upwardly with respect to the front surface 21 of the back rest element 2 so as to permit limited pivotal movements of the back rest element about pivotal axis 3 so as to effectively increase the space between the back rest element 2 and the single door of an automotive vehicle through which passengers must pass in entering and leaving the back seat of the vehicle, not shown.

As above indicated, the cover element 11 is pivoted at 12 for upward and rearward swinging movements of its rear end portion. Also preferably and as shown, the inner surface 22 of the cover element 11, has secured thereto a mirror 23 which may be used effectively by a passenger in the vehicle when the cover 11 is in an open position. Note that a chain, cord or the like 24, between side wall 8 and the cover 11 retains the cover in a desired open position beyond dead center. Also preferably and as shown, the box-like seat rest element is covered with any desired soft decorative outer cover 25.

When it is desired to utilize my novel structure, same is positioned approximately adjacent the elbow of the driver. Thereafter, it is forced rearwardly until the tongue 18 and locking lip 20 are forced through the crack 16 between the seat 1 and the back rest element 2. As above indicated, the tongue and tapered portion 15 will retain the arm rest device in the desired position against accidental movements. The height of the device, when in operative position, is substantially that of the arm rest conventionally appearing on the door of the car. In this manner equal support is given to both arms of the driver.

While I have shown my novel structure in use on a two door vehicle in which the back rest element of the front seat is pivotally secured to the rear end portion of the seat element in order to permit limited forward swinging movements of the former to allow ingress and egress of passengers entering and leaving the rear seat, it should be understood that my novel structure may also be used with great utility in the front seat of four door vehicles in which the back rest elements are rigidly secured to the front seats.

While I have shown a preferred embodiment of my novel device, it should be obvious that same is capable of modification without departure from the scope of the invention as defined in the appended claim.

What I claim is:

A combination storage compartment and arm rest for a driver of an automotive vehicle, said vehicle having an upholstered seat element and a cooperating upholstered upstanding back rest element pivotally secured to the rear end portion of said seat element and mounted thereon for limited forward swinging movements about a horizontal axis closely adjacent the upper surface of the seat element, said device comprising a box-like structure including a bottom, opposite side walls, front and rear walls interconnecting said side walls, and a removable cover, said side walls resting upon and conforming generally to the shape of the seat from the front portion to rear thereof, the upper edge of said rear wall being spaced from the front face of the back rest element and the lower edge of said rear wall meeting the lower edge of said front face at the juncture of said back rest element and said seat element, the rear edges of the side walls and the portion of said rear wall between the upper and lower edges being of the general shape of the lower part of said back rest element whereby to permit normal swinging movements of the back rest element, and a relatively thin tongue projecting downwardly and outwardly from the rear end portion of said device between said seat element and said back rest element.

References Cited in the file of this patent

UNITED STATES PATENTS

| Number | Name | Date |
|---|---|---|
| 2,524,659 | Gorman | Oct. 3, 1950 |
| 2,254,909 | Hines | Oct. 10, 1950 |